(12) United States Patent
Smahl

(10) Patent No.: US 11,577,436 B2
(45) Date of Patent: Feb. 14, 2023

(54) MOLD ASSEMBLY FOR INJECTION MOLDING OF A PLASTIC PIPE FITTING AND INJECTION MOLDED PIPE FITTING MADE OF PLASTICS

(71) Applicant: UPONOR INNOVATION AB, Virsbo (SE)

(72) Inventor: Jarmo Smahl, Lahti (FI)

(73) Assignee: UPONOR INNOVATION AB, Virsbo (SE)

( * ) Notice: Subject to any disclaimer, the term of this patent is extended or adjusted under 35 U.S.C. 154(b) by 110 days.

(21) Appl. No.: 16/967,611

(22) PCT Filed: Feb. 5, 2019

(86) PCT No.: PCT/EP2019/052746
§ 371 (c)(1),
(2) Date: Aug. 5, 2020

(87) PCT Pub. No.: WO2019/154794
PCT Pub. Date: Aug. 15, 2019

(65) Prior Publication Data
US 2021/0031419 A1    Feb. 4, 2021

(30) Foreign Application Priority Data

Feb. 6, 2018   (FI) ..................... 20185102

(51) Int. Cl.
*B29C 45/26*   (2006.01)
*B29C 45/73*   (2006.01)
*B29L 31/24*   (2006.01)

(52) U.S. Cl.
CPC .......... *B29C 45/2614* (2013.01); *B29C 45/73* (2013.01); *B29C 45/7312* (2013.01);
(Continued)

(58) Field of Classification Search
None
See application file for complete search history.

(56) References Cited

U.S. PATENT DOCUMENTS 5,516,470 A * 5/1996 Larsson .............. B29C 45/7337
264/102
5,935,621 A * 8/1999 Gellert ................ B29C 45/7312
425/549
(Continued)

FOREIGN PATENT DOCUMENTS

DE            19908936 A1     9/2000
DE       202008015124 U1     4/2010
(Continued)

OTHER PUBLICATIONS

International Search Report for International Application No. PCT/EP2019/052746; International Filing Date Feb. 5, 2019, dated Mar. 12, 2019, 3 pages.
(Continued)

*Primary Examiner* — Timothy Kennedy
*Assistant Examiner* — Olukorede Esan
(74) *Attorney, Agent, or Firm* — Cantor Colburn LLP

(57) ABSTRACT

A mold assembly (1) for injection molding of a plastic pipe fitting (2, 3). The pipe fitting comprises an elbow-shaped or a tee-shaped internal flow channel (4). At least one of the first core member (14) and the second core member (15) of the core package (12, 13) comprises a built-in cooling arrangement (20) for cooling of the core package (12, 13), the cooling arrangement (20) extending longitudinally inside said core member over a substantial length of said
(Continued)

core member. The pipe fitting (2, 3) comprises an elbow-shaped or tee-shaped internal flow channel (4) comprising at least two channel parts (5, 6, 7) arranged at a first angle ($\alpha$) in relation to each other, the channel parts (5, 6, 7) each having a circular cross-section and a smoothly radiused inner corner face (8) between each two channel parts being at said first angle in relation to each other, the at least one of the channel parts having an inner diameter D, a length L from central corner point to the end of the channel part, the inner corner face having a rounding radius R. The ratio (D/R) of the inner diameter D and the rounding radius R is in the range 2 to 5, and the ratio (L/D) of the length L and inner diameter D is in the range 8 to 3.

25 Claims, 3 Drawing Sheets

(52) U.S. Cl.
CPC ...... *B29K 2905/10* (2013.01); *B29K 2907/04* (2013.01); *B29L 2031/243* (2013.01); *B29L 2031/246* (2013.01)

(56) References Cited

U.S. PATENT DOCUMENTS

| | | | |
|---|---|---|---|
| 6,203,651 B1* | 3/2001 | Jarvenkyla | B29C 48/06 |
| | | | 156/244.11 |
| 2002/0114908 A1* | 8/2002 | Evans | B29C 45/2614 |
| | | | 428/36.9 |
| 2016/0193769 A1* | 7/2016 | Rodinsky | B29C 45/7312 |
| | | | 425/552 |
| 2018/0128408 A1* | 5/2018 | Souma | B29C 45/4421 |

FOREIGN PATENT DOCUMENTS

| | | |
|---|---|---|
| JP | 08034022 | 6/1996 |
| JP | 11058473 | 2/1999 |

OTHER PUBLICATIONS

Search Report for Finnish Patent App. No. 20185102, dated Sep. 19, 2018, 2 pages.

* cited by examiner

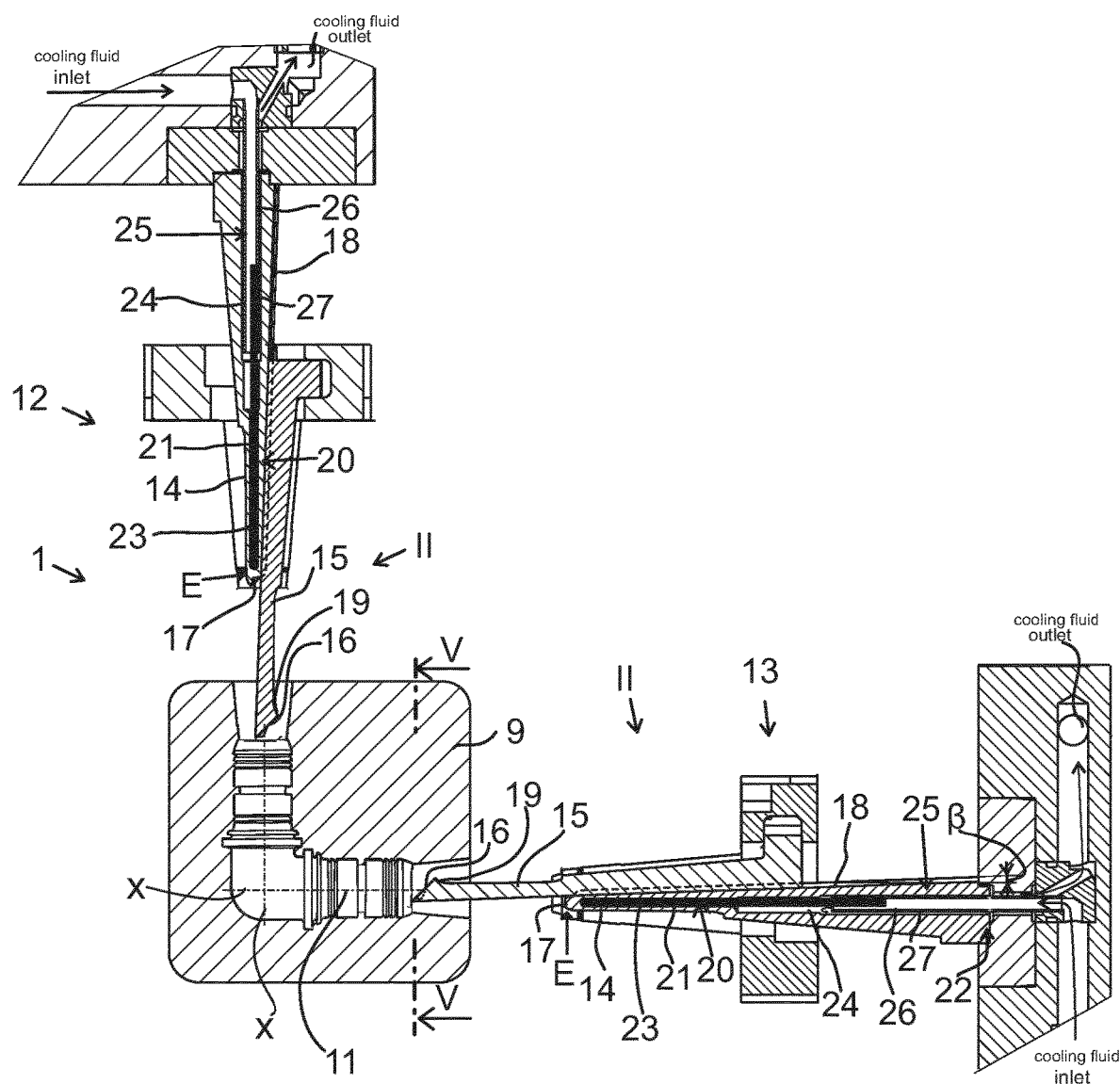
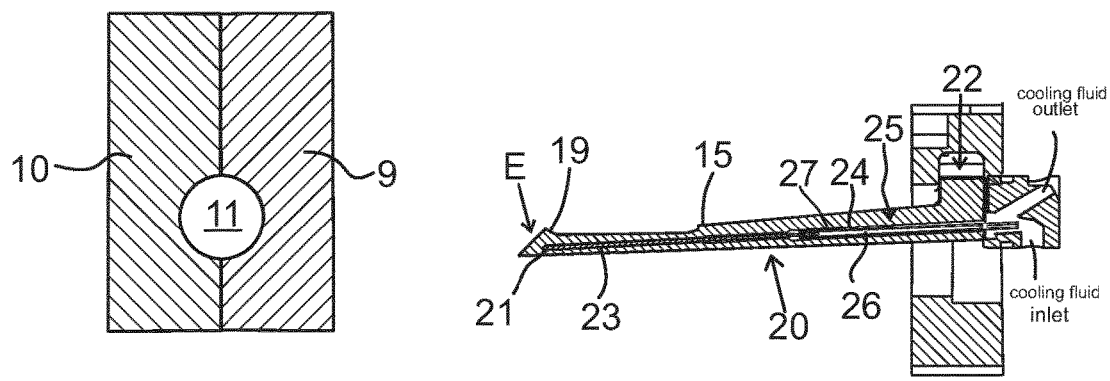
Fig. 4
Fig. 5　　　　Fig. 6

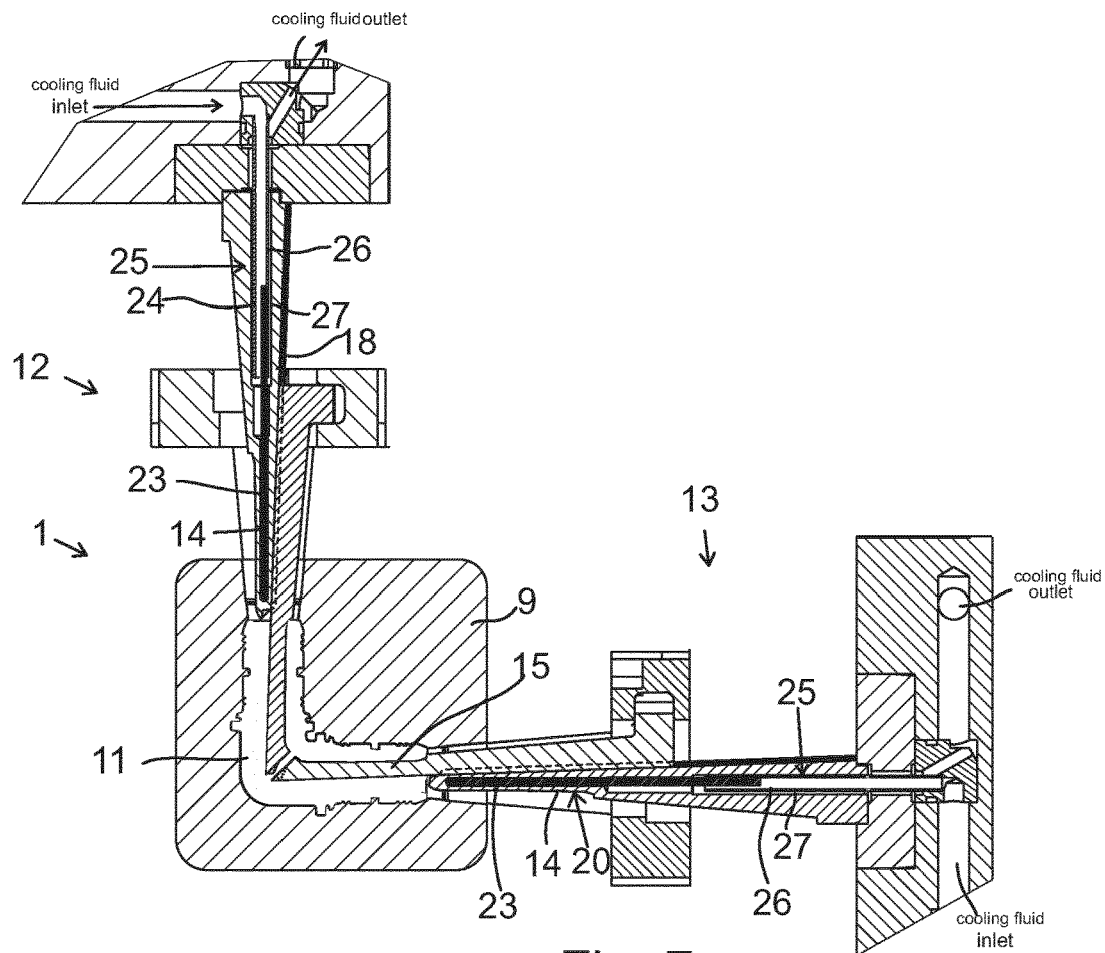
Fig. 7
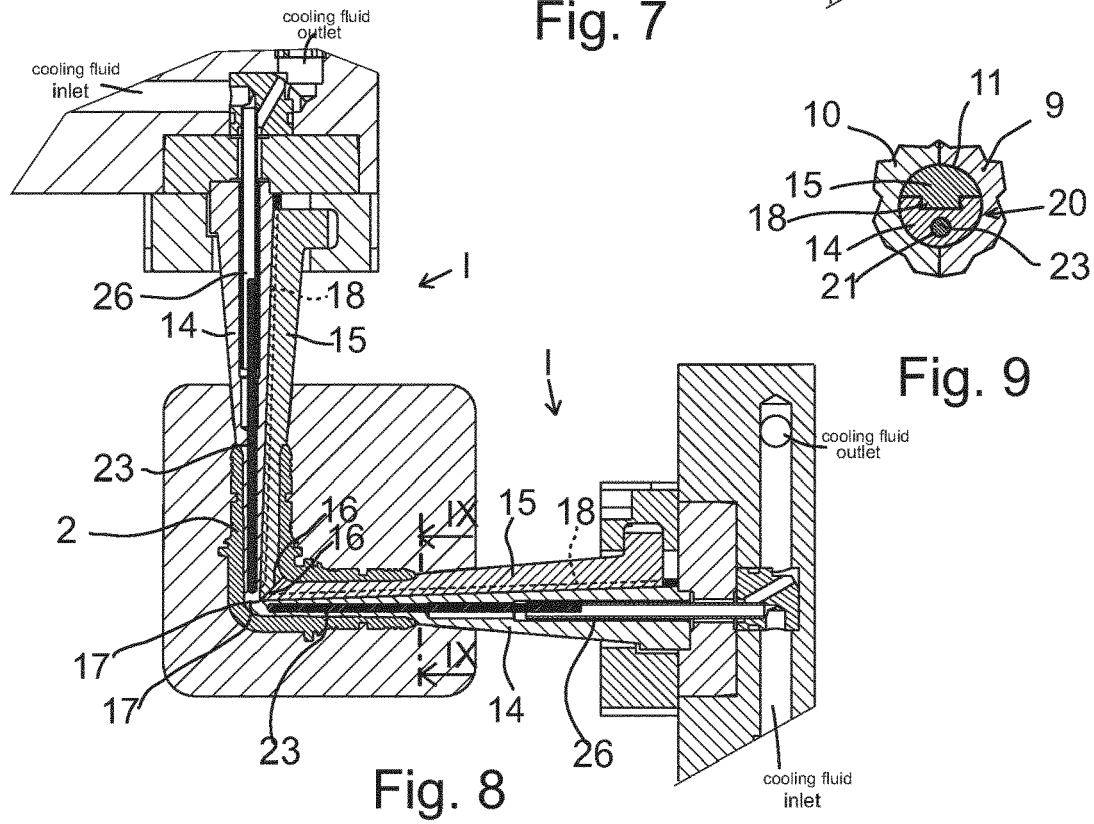
Fig. 8
Fig. 9

MOLD ASSEMBLY FOR INJECTION MOLDING OF A PLASTIC PIPE FITTING AND INJECTION MOLDED PIPE FITTING MADE OF PLASTICS

CROSS REFERENCE TO RELATED APPLICATIONS

This application is a National Stage application of PCT/EP2019/052746, filed Feb. 5, 2019, which claims the benefit of Finland Application No. 20185102, filed Feb. 6, 2018, both of which are incorporated by reference in their entirety herein.

FIELD OF THE INVENTION

The present invention relates to a mold assembly for injection molding of a plastic pipe fitting. Further the present invention relates to an injection molded pipe fitting made of plastics.

BACKGROUND OF THE INVENTION

In prior art, e.g. U.S. Pat. No. 7,153,125 discloses a mold assembly for injection molding of a plastic pipe fitting. The pipe fitting comprises an elbow-shaped or tee-shaped internal flow channel comprising at least two channel parts arranged at a first angle in relation to each other, the channel parts each having a circular cross-section and a smoothly radiused inner corner face between each two channel parts being at said first angle in relation to each other. The mold assembly comprises a pair of mold members adapted for movement between an open position and a closed position to define a mold cavity having a shape conforming to the exterior geometry of the pipe fitting to be molded. The mold assembly further comprises a pair of retractable core packages. Each core package comprises a first core member and a second core member. Each core package is movable between an advanced position protruding into said mold cavity and cooperating with each other to define the internal flow channel in the pipe fitting to be molded, and a retracted position substantially withdrawn from said mold cavity. The first core member and the second core member have distal ends with end faces for abutting engagement with each other when the first core member and the second core member are in advanced positions to define the internal flow channel with said channel parts being at the first angle in relation to each other. The first core member defines an outer portion of the internal flow channel and includes an inclined guide member extending longitudinally and at a second angle in relation to a longitudinal axis. The second core member defines an inner portion of the internal flow channel. The second core member is movably slidable along the inclined guide member. The second core member includes a curved inner edge disposed generally at a distal end thereof. The curved inner edges of the second core members cooperatively define the smoothly radiused inner corner face of the internal flow channel. The second core member is movable along the inclined guide member on the first core member upon movement of the core package toward said retracted position subsequent to molding of the pipe fitting within the mold cavity to shift the second core member towards a center axis of the internal flow channel for withdrawal of the core package from the mold cavity and the pipe fitting molded therein.

In order to reduce flow resistance inside the pipe fitting it is essential to be able to make a pipe fitting wherein the inner corner face of the internal flow channel is rounded. The collapsible core arrangement as described above allows a rounded inner corner face to be made. However, it has been difficult or impossible to make a small-size pipe fitting wherein the inner diameter of the circular internal flow channel is small and at the same time the length of channel part is relatively long relative to the diameter, i.e. the ratio of the length and inner diameter of the channel part is in the range 8 to 3, and the ratio of the inner diameter and the rounding radius is in the range 2 to 5. The conditions under which the injection molding cores must operate are also very severe: the pressure of the plastics to be injected is of the order of 1000 bar and the temperature is 400° C. This sets challenges to make the small-sized core members strong enough and reasonably effective for cycle times. The cycle time (mold open-mold closed-mold open) should not be no more than about 60 seconds to be economically feasible to produce masses of such pipe fittings.

OBJECTIVE OF THE INVENTION

The objective of the invention is to alleviate the disadvantages mentioned above.

SUMMARY OF THE INVENTION

According to a first aspect, the present invention provides a mold assembly for injection molding of a plastic pipe fitting. The pipe fitting comprises an elbow-shaped or tee-shaped internal flow channel. The internal flow channel comprises at least two channel parts arranged at a first angle in relation to each other. The channel parts each have a circular cross-section and a smoothly radiused inner corner face between each two channel parts being at said first angle in relation to each other. The mold assembly comprises a pair of mold members adapted for movement between an open position and a closed position to define a mold cavity having a shape conforming to the exterior geometry of the pipe fitting to be molded. The mold assembly further comprises a pair of retractable core packages each comprising a first core member and a second core member. Each core package is movable between an advanced position protruding into said mold cavity and cooperating with each other to define the internal flow channel in the pipe fitting to be molded, and a retracted position substantially withdrawn from said mold cavity. The first core member and the second core member have distal ends with end faces for abutting engagement with each other when first core member and second core member are in advanced positions to define the internal flow channel with said channel parts at the first angle in relation to each other. The first core member defines an outer portion of the internal flow channel and includes an inclined guide member extending longitudinally and at a second angle in relation to a longitudinal axis. The second core member defines an inner portion of the internal flow channel. The second core member is movably slidable along said inclined guide member. The second core member includes a curved inner edge disposed generally at a distal end thereof. The curved inner edges of the second core members cooperatively define the smoothly radiused inner corner face of the internal flow channel. The second core member is movable along the inclined guide member on the first core member upon movement of the core package toward said retracted position subsequent to molding of the pipe fitting within the mold cavity to shift the second core member towards a center axis of the internal flow channel for withdrawal of the core package from the mold cavity and the pipe fitting molded therein. According to the invention, at least one of the first core member and the second core member of the core package comprises a built-in cooling arrangement for cooling of the core package, the cooling arrangement extending longitudinally inside said core member over a substantial length of said core member.

The technical effect of the invention is that the cooling arrangement inside the core member enables effective transfer of heat from the core package and makes it possible to make small-sized pipe fittings with rounded inner corner faces with a reasonable cycle time of the order of about 60 seconds. The rounding of the inner corner face can reduce flow resistance significantly compared to a sharp inner corner and the invention brings this improvement now also for the small-sized pipe fittings.

In an embodiment of the mold assembly, the cooling arrangement comprises an elongated blind hole extending a substantial length of the core member between a support end of the core member and the distal end.

In an embodiment of the mold assembly, the cooling arrangement comprises a heat conductor element having high thermal conductivity, the heat conductor element being inserted in the blind hole.

In an embodiment of the mold assembly, the cooling arrangement comprises a cooling fluid channel for circulating cooling fluid inside the core member.

In an embodiment of the mold assembly, the heat conductor element is partly arranged to extend inside the cooling channel to be flushed by the cooling fluid.

In an embodiment of the mold assembly, cooling fluid is water.

In an embodiment of the mold assembly, cooling fluid is carbon dioxide ($CO_2$).

In an embodiment of the mold assembly, the cooling arrangement comprises a bubbler comprising a narrow tube arranged inside the cooling fluid channel, so that a gap is formed between the tube and the wall of the cooling channel. The cooling fluid is capable to flow via the tube from the end of the tube and to flow out via the gap.

In an embodiment of the mold assembly, the heat conductor element is partly arranged inside the tube for cooling the heat conductor element with the cooling fluid.

In an embodiment of the mold assembly, the heat conductor element is a pin made of solid material having high thermal conductivity.

In an embodiment of the mold assembly, the heat conductor element is made of beryllium copper alloy.

In an embodiment of the mold assembly, the heat conductor element is a thermal pin which is a sealed cylinder filled with a fluid. The fluid inside the thermal pin vaporizes as it draws heat from the core member and condenses as it releases heat to the cooling fluid at the outer end of the thermal pin.

In an embodiment of the mold assembly, the first core member is made of tool steel.

In an embodiment of the mold assembly, the first core member is made of beryllium copper alloy.

In an embodiment of the mold assembly, the first core member comprises a diamond-like carbon (DLC) coating.

In an embodiment of the mold assembly, the second core member is made of tool steel.

In an embodiment of the mold assembly, the second core member is made of beryllium copper alloy.

In an embodiment of the mold assembly, the second core member comprises a diamond-like carbon (DLC) coating.

In an embodiment of the mold assembly, the first angle is 30°-120°.

In an embodiment of the mold assembly, the first angle is 90°.

In an embodiment of the mold assembly, the second angle is in the range of 1° to 12°.

In an embodiment of the mold assembly, the mold cavity formed by the mold members and the core packages are configured to form a pipe fitting wherein at least one of the channel parts has an inner diameter D, a length L from central corner point to the end of the channel part, the inner corner face having a rounding radius R, and wherein the ratio (D/R) of the inner diameter D and the rounding radius R is in the range 2 to 5, and the ratio (L/D) of the length L and inner diameter D is in the range 8 to 3.

According to a second aspect, the present invention provides an injection molded pipe fitting made of plastics by a mold assembly according to the first aspect. The pipe fitting comprises an elbow-shaped or tee-shaped internal flow channel comprising at least two channel parts arranged at a first angle in relation to each other. The channel parts each have a circular cross-section and a smoothly radiused inner corner face between each two channel parts being at said first angle in relation to each other. The at least one of the channel parts have an inner diameter D, a length L from central corner point to the end of the channel part, the inner corner face having a rounding radius R. According to the invention, the ratio D/R of the inner diameter D and the rounding radius R is in the range 2 to 5, and the ratio L/D of the length L and inner diameter D is in the range 8 to 3.

In an embodiment of the pipe fitting, the inner diameter D is 5.0-6.5 mm, the length L from central corner point to the end of the channel part is 25.0 mm-40.0 mm, and the rounding radius R of the inner corner face is 2.5-3.2 mm.

In an embodiment of the pipe fitting, the inner diameter D is 8.0-9.5 mm, the length L from central corner point to the end of the channel part is 35.0 mm-55.0 mm, and the rounding radius R of the inner corner face is 3.5-4.7 mm.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 4 is a schematic cross-sectional view of a mold assembly according to one embodiment of the invention for producing an elbow pipe fitting, FIG. 5 shows a cross-section VI-VI from FIG. 4, FIG. 6 shows an alternative for the second core member of FIG. 4, in which alternative the second core member is equipped with a cooling arrangement according to the invention, FIG. 7 shows the mold assembly of FIG. 4 during the process cycle wherein the second core member has been moved to an advanced position into the mold cavity, FIG. 8 shows the mold assembly of FIG. 7 during the process cycle wherein the first core member has been moved to an advanced position into the mold cavity, both core members being ready for injection molding of the elbow pipe fitting, and FIG. 9 is a cross-section IX-IX from FIG. 8.

DETAILED DESCRIPTION OF THE INVENTION

Figure 1:
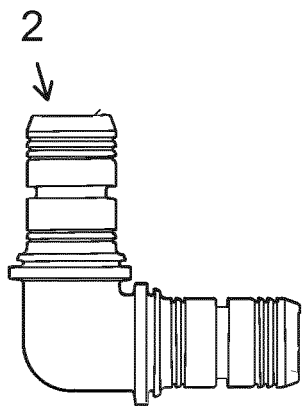
FIG. 1 is a side view of an injection molded plastic elbow pipe fitting according to a first embodiment of the invention.
Figure 2:
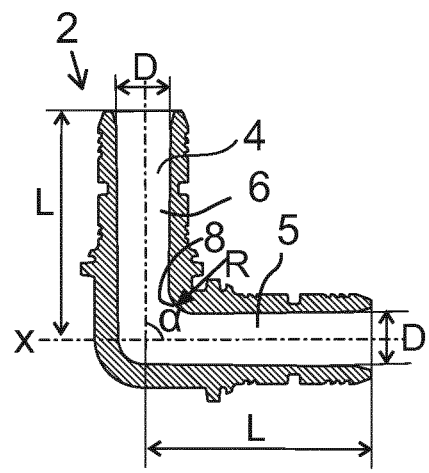
FIG. 2 is a cross-section of the elbow pipe fitting of FIG. 1.

FIGS. 1 and 2 show an injection molded pipe fitting 2 made of plastics. It is made by a mold assembly 1 of FIGS. 4 to 9 which is disclosed with reference to said Figures.

The pipe fitting 2 is an elbow pipe fitting comprising an elbow-shaped internal flow channel 4. In the elbow pipe fitting 2 the internal flow channel 4 comprises two channel parts 5 and 6 arranged at a first angle α of 90° in relation to each other. The channel parts 5 and 6 have a circular cross-section and a smoothly radiused inner corner face 8 between the two channel parts 5 and 6. The channel parts 5 and 6 have an inner diameter D and a length L from central corner point to the end of the channel part. The inner corner face 8 has a rounding radius R. The ratio D/R of the inner diameter D and the rounding radius R is in the range 2 to 5, and the ratio L/D of the length L and inner diameter D is in the range 8 to 3.

Figure 3:
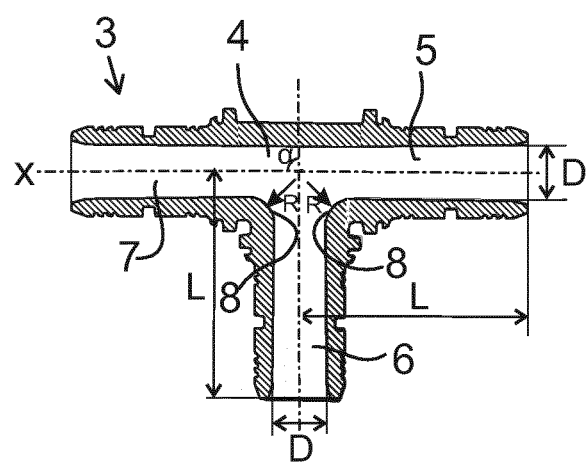
FIG. 3 is a cross-section of an injection molded plastic tee-shaped pipe fitting according to a second embodiment of the invention.

FIG. 3 shows an injection molded tee-shaped pipe fitting 3 made of plastics. The pipe fitting 3 comprises a tee-shaped internal flow channel 4 comprising three channel parts 5, 6 and 7. The channel part 6 is arranged at a first angle α of 90° in relation to the two other channel parts 5 and 7. The channel parts 5, 6, 7 each have a circular cross-section and a smoothly radiused inner corner faces 8 between the channel parts 6 and 7 and channel parts 6 and 5. The channel parts 5, 6 and 7 have an inner diameter D and a length L from central corner point to the end of the channel part. The inner corner faces 8 have rounding radiuses R. The ratio D/R of the inner diameter D and the rounding radius R is in the range 2 to 5, and the ratio L/D of the length L and inner diameter D is in the range 8 to 3. The mold assembly for making the tee-shaped pipe fitting can be made by using three core packages following the principles of the invention (not shown in Figures).

FIGS. 4, 7 and 8 schematically show a mold assembly 1 adapted for injection molding of a plastic pipe elbow fitting 2 as shown in FIGS. 1 and 2. In these FIGS. 4, 7 and 8 the core packages 12 and 13 and the first and second core members 14, 15 thereof are shown in different positions in relation to the mold members 9, 10 forming the mold cavity 11.

The mold assembly 1 comprises a pair of mold members 9, 10 adapted for movement between an open position and a closed position to define a mold cavity 11 having a shape conforming to the exterior geometry of the pipe fitting 2 to be molded. The mold assembly 1 further comprises a pair of retractable core packages 12, 12. Each of the two core packages 12 and 13 comprises a first core member 14 and a second core member 15. The core packages 12, 13 are movable between an advanced position I (see FIG. 8) and a retracted position II (see FIG. 3). As can be seen in FIG. 8, in the advanced position I the core packages 12 and 13 protrude into said mold cavity 11 and cooperate with each other to define the internal flow channel 4 in the pipe fitting 2 to be molded. Referring to FIG. 4, in the retracted position II the core packages 12 and 13 are substantially withdrawn from said mold cavity 11. The retracted position II enables a sufficiently solidified and cooled pipe fitting can be knocked out from the mold cavity between the molding cycles when the mold members are moved to an open position.

The first core member 14 and the second core member 15 have distal ends E with end faces 16, 17 for abutting engagement with each other when the first core member 14 and second core member 15 are in advanced positions I to define the internal flow channel 4 with said channel parts 5 and 6 being at the first angle α in relation to each other. The first core member 14 defines an outer portion of the internal flow channel 4 and includes an inclined guide member 18 (see also FIG. 9). The inclined guide member 18 extends longitudinally and at a second angle β in relation to a longitudinal axis of the channel part. The second angle β is preferably in the range of 1° to 12° depending of the dimensions of the pipe fitting. In shown the example the angle β is 2°. In the embodiment shown in FIG. 9, the inclined guide member 18 may by a groove formed in the first core member 14 to slidably receive therein a tongue formed in the second core member 15. The second core member 15 defines an inner portion of the internal flow channel 4. The second core member 15 is movably slidable along said inclined guide member 18. As can be seen e.g. in FIG. 4, the second core member 15 includes a curved inner edge 19 disposed generally at a distal end thereof. The curved inner edges 19 of the second core members 15 cooperatively define the smoothly radiused inner corner face 8 of the internal flow channel 4. The second core member 15 is movable along the inclined guide member 18 on the first core member 14 upon movement of the core package 12, 13 toward said retracted position II subsequent to molding of the pipe fitting 2 within the mold cavity 11 to shift the second core member 15 towards a center axis x of the internal flow channel 4 for withdrawal of the core package 12, 13 from the mold cavity 11 and the pipe fitting 2 molded therein. In the embodiment shown in FIGS. 4, 7 and 8 the first core member 14 of the core packages 12, 13 comprises a built-in cooling arrangement 20 for cooling of the core package 12, 13. The cooling arrangement 20 extends longitudinally inside the first core member 14 over a substantial length of said core member.

FIG. 6 shows that, if needed, also the second core member 15 may be arranged to include a similar cooling arrangement. Thus, a cooling arrangement 20 may be included in either one of the first and second core members 14, 15, or included in both of them.

The cooling arrangement 20 comprises an elongated blind hole 21 extending a substantial length of the core member 14 and/or 15 between a support end 22) of the core member 14, 15 and the distal end E thereof. A heat conductor element 23 having high thermal conductivity may be inserted in the blind hole 21, as shown in FIGS. 4, 7 and 8 and 9. The cooling arrangement 20 also comprises a cooling fluid channel 24 for circulating cooling fluid inside the core member 14, 15. The heat conductor element 23 is partly arranged to extend inside the cooling channel 24 to be flushed by the cooling fluid. Cooling fluid can be water or carbon dioxide $CO_2$.

In the shown examples, the cooling arrangement 20 comprises a so-called bubbler 25. The bubbler 25 comprises a narrow tube 26 arranged inside the cooling fluid channel 24 so that a gap 27 is formed between the tube and the wall of the cooling channel 24. The cooling fluid is thus capable to flow via the tube 26 from the end of the tube and to flow out via the gap 27. As shown in Figures, the heat conductor element 23 may partly be arranged inside the tube 26 for cooling the heat conductor element 23 with the cooling fluid which flushes a part of the heat conductor element 23. The heat conductor element 23 may be a pin made of solid material having high thermal conductivity, such as copper alloy or beryllium copper alloy. Alternatively, the heat conductor element 23 may be a so-called thermal pin. Thermal pin is a sealed cylinder filled with a fluid which is vaporized as it draws heat from the core member and condenses as it releases heat to the cooling fluid. The first core member 14 and/or second core member 15 may made of tool steel (Orvar, Unimax, manufacturer Uddeholm, Sweden) or from a metal having higher thermal conductivity, such as beryllium copper alloy. The thermal conductivity of tool steel is about 25 W/m·K. Beryllium copper has a thermal conductivity of 100-350 W/m·K. The strength and wear resistance of the core members 14, 15 can be increased by a diamond-like carbon (DLC) coating. DLC coating is very hard, has low friction and provides a long life time for the core members.

Although the mold assembly 1 and pipe fittings 2 and 3 have been described for pipe fittings having the first angle α of 90°, the invention is equally applicable for mold assemblies for making pipe fittings and for pipe fittings having the first angle α of 30°-120°.

While the present inventions have been described in connection with a number of exemplary embodiments, and implementations, the present inventions are not so limited, but rather cover various modifications, and equivalent arrangements, which fall within the scope of prospective claims.

The invention claimed is:

1. A mold assembly (1) for injection molding of a plastic pipe fitting (2, 3), the pipe fitting comprising an elbow-shaped or tee-shaped internal flow channel (4) comprising at least two channel parts (5, 6, 7) arranged at a first angle (a) in relation to each other, the channel parts (5, 6, 7) each having a circular cross-section and a smoothly radiused inner corner face (8) between each two channel parts being at said first angle in relation to each other, the mold assembly (1) comprising
a pair of mold members (9, 10) adapted for movement between an open position and a closed position to define a mold cavity (11) having a shape conforming to the exterior geometry of the pipe fitting (2, 3) to be molded,
a pair of retractable core packages (12, 13) each comprising a first core member (14) and a second core member (15), each core package (12, 13) being movable between an advanced position (I) protruding into said mold cavity (11) and cooperating with each other to define the internal flow channel (4) in the pipe fitting (2, 3) to be molded, and a retracted position (II) substantially withdrawn from said mold cavity (11), the first core member (14) and the second core member (15) having distal ends (E) with end faces (16, 17) for abutting engagement with each other when said first core member (14) and second core member (15) are in advanced positions (I) to define the internal flow channel (4) with said channel parts (5, 6, 7) at the first angle (a) in relation to each other, the first core member (14) defining an outer portion of the internal flow channel (4) and including an inclined guide member (18) extending longitudinally and at a second angle ((3) in relation to a longitudinal axis, and the second core member (15) defining an inner portion of the internal flow channel (4), the second core member (15) being movably slidable along said inclined guide member (18) and including a curved inner edge (19) disposed generally at a distal end thereof, wherein said curved inner edges (19) of the second core member (15) cooperatively define the smoothly radiused inner corner face (8) of the internal flow channel (4); and wherein the second core member (15) is movable along the inclined guide member (18) on the first core member (14) upon movement of the core package (12, 13) toward said retracted position subsequent to molding of the pipe fitting (2, 3) within the mold cavity (11) to shift the second core member (15) towards a center axis (x) of the internal flow channel (4) for withdrawal of the core package (12, 13) from the mold cavity (11) and the pipe fitting (2, 3) molded therein, characterized in that at least one of the first core member (14) and the second core member (15) of the core package (12, 13) comprises a built-in cooling arrangement (20) for cooling of the core package (12, 13), the cooling arrangement (20) extending longitudinally inside said core member over a substantial length of said core member.

2. The mold assembly according to claim 1, characterized in that the cooling arrangement (20) comprises an elongated blind hole (21) extending a substantial length of the core member between a support end (22) of the core member (14, 15) and the distal end (E).

3. The mold assembly according to claim 2, characterized in that the cooling arrangement (20) comprises a heat conductor element (23) having high thermal conductivity, the heat conductor element (23) being inserted in the blind hole (21).

4. The mold assembly according to claim 3, characterized in that the cooling arrangement (20) comprises a cooling fluid channel (24) for circulating cooling fluid inside the core member (14, 15).

5. The mold assembly according to claim 4, characterized in that the heat conductor element (23) is partly arranged to extend inside the cooling fluid channel (24) to be flushed by the cooling fluid.

6. The mold assembly according to claim 4, characterized in that the cooling fluid is water.

7. The mold assembly according to claim 4 characterized in that the cooling fluid is carbon dioxide ($CO_2$).

8. The mold assembly according to claim 4, characterized in that the cooling arrangement (20) comprises a bubbler (25) comprising a narrow tube (26) arranged inside the cooling fluid channel (24) so that a gap (27) is formed between the tube and the wall of the cooling fluid channel (24), whereby the cooling fluid is capable to flow via the tube (26) to fountain from the end of the tube and to flow out via the gap (27).

9. The mold assembly according to claim 8, characterized in that the heat conductor element (23) is partly arranged inside the tube (26) for cooling the heat conductor element with the cooling fluid.

10. The mold assembly according to claim 3, characterized in that the heat conductor element (23) is a pin made of solid material having high thermal conductivity.

11. The mold assembly according to claim 9, characterized in that the heat conductor element (23) is made of beryllium copper alloy.

12. The mold assembly according to claim 3, characterized in that the heat conductor element (23) is a thermal pin which is a sealed cylinder filled with a fluid which is vaporized as it draws heat from the core member, and condenses as it releases heat to the cooling fluid.

13. The mold assembly according to claim 1, characterized in that the first core member (14) is made of tool steel.

14. The mold assembly according to claim 1, characterized in that the first core member (14) is made of beryllium copper alloy.

15. The mold assembly according to claim 13, characterized in that the first core member (14) comprises a diamond-like carbon (DLC) coating.

16. The mold assembly according to claim 1, characterized in that the second core member (15) is made of tool steel.

17. The mold assembly according to claim 1, characterized in that the second core member (15) is made of beryllium copper alloy.

18. The mold assembly according to claim 16, characterized in that the second core member (15) comprises a diamond-like carbon (DLC) coating.

19. The mold assembly according to claim 1, characterized in that the first angle ($\alpha$) is 30°-120°.

20. The mold assembly according to claim 1, characterized in that the first angle ($\alpha$) is 90°.

21. The mold assembly according to claim 1, characterized in that the second angle ($\beta$) is in the range of 1° to 12°.

22. The mold assembly according to claim 1, characterized in that the mold cavity (11) formed by the mold members (9, 10) and the core packages (12, 13) are configured to form a pipe fitting (2, 3) wherein at least one of the channel parts (5, 6, 7) has an inner diameter D, a length L from central corner point to the end of the channel part, the inner corner face having a rounding radius R, and wherein the ratio (D/R) of the inner diameter D and the rounding radius R is in the range 2 to 5, and the ratio (L/D) of the length L and inner diameter D is in the range 8 to 3.

23. An injection molded pipe fitting (2, 3) made of plastics by a mold assembly (1) according to claim 1, the pipe fitting (2, 3) comprising an elbow-shaped or tee-shaped internal flow channel (4) comprising at least two channel parts (5, 6, 7) arranged at a first angle (a) in relation to each other, the channel parts (5, 6, 7) each having a circular cross-section and a smoothly radiused inner corner face (8) between each two channel parts being at said first angle in relation to each other, the at least one of the channel parts having an inner diameter D, a length L from central corner point to the end of the channel part, the inner corner face having a rounding radius R, characterized in that the ratio (D/R) of the inner diameter D and the rounding radius R is in the range 2 to 5, and the ratio (L/D) of the length L and inner diameter D is in the range 8 to 3.

24. The injection molded pipe fitting according to claim 23, characterized in that the inner diameter D is 5,0-6,5 mm, the length L from central corner point to the end of the channel part is 25,0 mm -40,0 mm, and the rounding radius R of the inner corner face is 2,5-3,2 mm.

25. The injection molded pipe fitting according to claim 23, characterized in that the inner diameter D is 8,0-9,5 mm, the length L from central corner point to the end of the channel part is 35,0 mm -55,0 mm, and the rounding radius R of the inner corner face is 3,5-4,7 mm.

* * * * *